(12) United States Patent
Lokuge

(10) Patent No.: US 6,252,597 B1
(45) Date of Patent: Jun. 26, 2001

(54) SCALABLE USER INTERFACE FOR GRAPHICALLY REPRESENTING HIERARCHICAL DATA

(75) Inventor: Ishantha Lokuge, Mountain View, CA (US)

(73) Assignee: Netscape Communications Corporation, Moutain View, CA (US)

(*) Notice: Subject to any disclaimer, the term of this patent is extended or adjusted under 35 U.S.C. 154(b) by 0 days.

(21) Appl. No.: 08/800,862

(22) Filed: Feb. 14, 1997

(51) Int. Cl.[7] .............................. G06F 3/00; G06F 17/30

(52) U.S. Cl. .......................................... 345/353; 345/357

(58) Field of Search .................................... 345/353, 357; 382/298

(56) References Cited

U.S. PATENT DOCUMENTS

| | | | | |
|---|---|---|---|---|
| 4,790,028 | * | 12/1988 | Ramage | 382/298 |
| 5,262,761 | * | 11/1993 | Scandura et al. | 345/133 |
| 5,295,243 | * | 3/1994 | Robertson et al. | 395/348 |
| 5,339,390 | * | 8/1994 | Robertson et al. | 395/342 |
| 5,469,539 | * | 11/1995 | Usuda | 395/353 |
| 5,559,944 | * | 9/1996 | Ono | 395/353 |
| 5,590,250 | * | 12/1996 | Lamping et al. | 395/127 |
| 5,619,632 | * | 4/1997 | Lamping et al. | 345/441 |
| 5,623,588 | * | 4/1997 | Gould | 345/326 |
| 5,638,523 | * | 6/1997 | Mullet et al. | 345/326 |
| 5,754,809 | * | 5/1998 | Gandre | 345/343 |
| 5,786,820 | * | 7/1998 | Robertson | 345/357 |
| 5,801,703 | * | 9/1998 | Bowden et al. | 345/357 |
| 5,821,926 | * | 10/1998 | Arita | 345/349 |
| 5,835,087 | * | 11/1998 | Hertz et al. | 345/327 |
| 5,852,439 | * | 12/1998 | Musgrove et al. | 345/353 |
| 5,870,559 | * | 2/1999 | Leshem et al. | 709/224 |
| 5,986,657 | * | 11/1999 | Berteig et al. | 345/357 |

OTHER PUBLICATIONS

Johnson, B. et al. "Tree–maps: a Space–filling Approach to the Visualization of Hierarchical Information Structures", Proc. Conf. on Visualization '91, IEEE Comp. Pubs., pp.284–291, Oct. 1991.*

Lamping, J. et al., "A Focus+context Technique Based on Hyperbolic Geometry for Visualizing Large Structures", Proc. on Human Factors in Computing Systems CHI'95, ACM, pp. 401–408, May 1995.*

Citrin, W. et al., "Scalable Interfaces to Support Program Comprehension", Proc. of the 4th Workshop on Program Comprehension, IEEE Comp. Soc. Press, pp. 123–132, Mar. 1996.*

(List continued on next page.)

Primary Examiner—Mark R. Powell
Assistant Examiner—Jeffrey Allen Rossi
(74) Attorney, Agent, or Firm—Micheal A. Glenn

(57) ABSTRACT

A graphical user interface provides a scalable information structure. Interactive categories are displayed as expansive locations on a display as part of a desktop. In a first preferred embodiment of the invention, each category in a tier of an information structure occupies a dedicated expansive location in a list displayed within a defined region on the display. A location occupied by a selected category is expanded or compressed to display the next tier in the information hierarchy as a list, or as a cluster. Remaining locations are resized to accommodate newly-displayed contents within the defined region. The list is directly scrolled by selecting and moving locations with a pointing device. In a second, equally preferred embodiment of the invention, expansive locations are displayed as a cluster arrangement. A selected cluster is highlighted and expanded to display the next tier in the information hierarchy as a list, or as a cluster. Any previously-selected cluster is deselected and contracted. An expansive location may include a text descriptor, a test command, or a pictorial icon. Hypertext Markup Language (HTML), Email, or cached WWW page links may also be embedded within a list.

28 Claims, 16 Drawing Sheets

OTHER PUBLICATIONS

Sarkar, M. and Brown, M.H., "Graphical Fisheye Views", Communications of the Association on Computing Machinery, v. 37, No. 12, pp. 73–84, Dec. 1994.*

Citrin, W. et al., "Incorporating Fisheyeing into aVisual Programming Environment", Proc. on th IEEE Symp. on Visual Languages, IEEE Comp. Soc. Press, pp. 20–28, Sep. 1996.*

"inXight, A Xerox New Enterprise Company", Information Visualization Technology, published by Xerox Corp., Dec. 1996.

"A New Look for the WEB", San Jose Mercury News, Tuesday, Jan. 14, 1997, p. C1, by Elizabeth Wasserman.

* cited by examiner

SCALABLE USER INTERFACE FOR GRAPHICALLY REPRESENTING HIERARCHICAL DATA

BACKGROUND OF THE INVENTION

1. Technical Field

The invention relates to accessing information in computer systems. More particularly, the invention relates to a graphical user interface for computerbased systems.

2. Description of the Prior Art

In prior art computer systems, information, such as contained in a file structure, may be accessed in any of several ways. FIG. 1 is a perspective view of a computer system 10, according to the prior art, showing a keyboard 12 command used to access a computer database stored on a hard disk drive 14. Individual areas which define commands or items in a menu may be highlighted by using a pointing device, such as a mouse 18 or trackball. When selected, the highlighted area opens to display information that may be accessed in such area or commands that may be issued to the computer from such area. This information is displayed on the computer monitor 16. The display area is organized in modern computer systems to resemble a familiar workspace, and is known metaphorically as the desktop 20.

A desktop is typically configured to represent information stored in the computer, or commands available to operate various features of the computer, in a convenient manner. For example, a word processing category can include subcategories for each individual word processing program. Each program, in turn, can include subcategories for program modules, such as templates, a spell checker, and font storage. The graphical user interface embodied in the desktop effectively exploits this information structure.

Such graphical user interface, in conjunction with the desktop, provides interactive, graphical or pictorial, displays that represent organized information, commands, and/or file structures within the computer system. For example, a graphical representation in the form of an icon, pull down menu, or scroll bar may be provided for such items as a computer operating system, a word processing program, stored financial data, or communication software. Selecting a particular graphical representation provides access to its contents, such as the stored financial data; and/or provides access to additional levels of information, if the information is organized hierarchically. Selecting a graphical representation of a software program, such as a virus checker program, launches the program.

Thus, a hierarchy of graphical representations, e.g. icons, may be organized in nested layers. FIG. 2 is a front view of a computer display 20 showing pictorial icons 22 according to the prior art. Selecting the word processor icon 24 produces a display of the program module icons 26. The nested layers may be indented.

It is known to use a scrollbar 21 to access window contents that are not displayed. The scrollbar typically includes arrows 23 that are selected to move the contents display up, down, left, or right. The scrollbar may also include an interactive area 25 that spatially represents a location within the window.

Selecting a part of this interactive area causes the corresponding location of the window to be displayed.

A scrollbar is often inconvenient to use when large file structures are open for display. The user must select a directional arrow and wait for the file of interest to scroll to the appropriate window location. Alternatively, the user must guess the location on the interactive area that corresponds to that of the desired file location file.

A graphical user interface does not eliminate the need for a text-based structure. However, the use and presentation of the text commands is significantly changed from the older text-based operating systems. FIG. 3 is a front view of a computer display 20 showing a text-based menu bar 32 according to the prior art.

For example, a typical software program includes a text menu that is displayed when the program is running. This text menu is frequently organized in a hierarchical file structure. A word processor text menu may include categories for File 33, Layout 34, Font 28, and Utilities 36. The Utilities category may include a spell checker 37, word counter 38, or equation editor 39.

The textual representations in the menu include both hierarchical storage categories and commands. Selecting the command "Quit". causes a software program to shut down. Selecting the storage category "Font" 28 produces a display of the fonts 30 stored on the computer that are available to the program. A particular font may be selected by scrolling through this category. In effect, the text itself is used as a graphical representation of the underlying category or command. Instead of typing in a text-based command, the user selects a pre-existing text representation in the same manner as selecting a pictorial icon.

In one system known in the prior art, a selected icon or text opens a window, i.e. a dedicated display area on the desktop, to display a folder, i.e. a graphical representation of a category. The folder is opened to show the next tier of nested subcategories contained therewithin. It is possible to mix both icons and text within a single folder. For example, a word processor program folder may have a pictorial icon. When the icon is selected, the word processor folder opens to display a window showing a textual listing of categories. Selecting an individual text category opens a window to display icons representing the next tier of subcategories.

Any number of these windows may be kept open at the same time on the desktop. However, the desktop has a limited area. Keeping too many open windows clutter the desktop and makes it difficult to locate desired information. Furthermore, the greater the number of open windows on the desktop, the smaller the size each one must be to be fully displayed. As the size of a window decreases, the amount of its contents that can be displayed, as well as its legibility, also decreases. While an individual window can be resized, the size of the contents of that window, whether icon or text, remains the same. Thus, the smaller the window, the fewer the icons displayed. The more entries in a list, the greater the amount of entries that are not displayed in the window.

Another display known in the prior art is the "tree." Highlighting a folder or icon spatially displays its contents. The user can move through each "branch" on the display to reach lower level tiers of subcategories. The spatial representation of the file tree is advantageous in that the user always knows the location of a particular category or folder within the data structure.

The entries in each tier of the file tree may be displayed in separate windows. Alternately, subcategory entries may be displayed as indented lists beneath their associated category. However, as more entries are displayed, the vertical expansion of the list can exceed the size of the desktop. Thus, not all list entries can be displayed at one time.

The amount of branches in the file tree that can be displayed at a time is limited by the amount of desktop space available. The file tree may expand outward in only one direction, for example, from left to right. In such case, as the tree is expanded to show the windows containing the lower tier entries, the higher level entries are temporarily pushed off the desktop. Alternately, the file tree may be configured to reverse direction when the edge of the desktop is reached. In such case, the windows containing the lower tier entries cover the previously-opened windows containing higher level entries.

Furthermore, as each file tree is expanded in one direction, for example, horizontally, the windows containing the branches may become larger in both horizontal and vertical directions, depending upon the number of file entries therein. Open windows of other file trees are therefore covered.

A hyperbolic tree browser, referred to as inXight, has been developed at Xerox Corporation's Palo Alto Research Center in Palo Alto, Calif. Such browser provides a graphical visualization of the myriad links throughout the World Wide Web. The browser provides a "you are here" orientation that allows users to orient themselves not only according to where they are, but also to where they've been. However, no provision is made for preserving a file structure in a semblance of its original format, nor for conserving the area consumed on a display when displaying such browser.

It would therefore be an advantage to provide a computer graphical user interface that can visibly present large file structures on a desktop. It would be a further advantage if such graphical user interface clearly displayed the file categories of interest to the user while maintaining a display of the overall file structure. It would be yet another advantage if categories of such graphical user interface were easily movable to different locations on the desktop.

SUMMARY OF THE INVENTION

The invention provides a graphical user interface having a scalable file structure for use with a computer system. In the preferred embodiment of the invention, interactive categories are displayed, for example as expansive locations on a computer display.

In a general sense, the invention provides a scalable information structure that includes an interactive graphical user interface for viewing the scalable information structure on a display. The interactive graphical user interface comprises at least one defined region on the display. The region comprises at least one location representing an information object. The invention further comprises means for selecting the at least one location to display the information object represented by the location within the region in either of a first format and at least one additional format. The first format and the at least one additional format provide user selected indications of at least information object prominence, contents, or grouping or combinations thereof. The indications are all provided within the region, and the information structure is displayed in its entirety in both the first format and the at least one additional format.

In a first preferred embodiment of the invention, expansive locations are displayed as a list within a defined region on the desktop. Each category in the top tier of an information hierarchy occupies a dedicated expansive location in the list. When a category is selected, the location occupied by that category is expanded to display the next tier in the information hierarchy. The remaining locations are compressed to accommodate the newly-displayed information within the defined region of the list display. The list may be directly scrolled by selecting and moving locations with a pointing device. A compress button may also be provided to collapse an expanded hierarchy.

In a second, equally preferred embodiment of the invention, the expansive locations are displayed as a cluster arrangement. Each cluster includes a plurality of categories, each occupying an expansive location. A selected cluster is highlighted and expanded, while any previously-selected cluster is deselected and contracted. A selected cluster may also be moved to a position of prominence on the computer display, e.g. the center of the display, while the remaining clusters may be moved to positions of subordinance, such as the edges of the computer display. When a category within the cluster is selected, the location is expanded to display the next tier in the information hierarchy. This next tier may be displayed as a list, or as a cluster. The cluster thus provides a series of ripples, where each ripple displays a different level of the information hierarchy. A cluster may also be embedded within a list; and a list may be embedded within a cluster.

An expansive location may include a text descriptor, a test command, or a pictorial icon. Hypertext Markup Language (HTML) links or cached World Wide Web (WWW) pages may also be embedded within a cluster or list.

The invention also provides a dynamically scalable indentation scheme that displays deeper levels of a hierarchy with greater indentation and higher levels of the hierarchy with less indentation.

DETAILED DESCRIPTION OF THE INVENTION

The invention provides a graphical user interface (GUI) having a scalable display for showing information, commands, and/or file structures substantially in their entirety. In the invention, interactive categories within lists or clusters are displayed as expansive locations on a computer display of a computer system. Such locations are expanded or compressed upon respective selection or deselection to permit the user to view subcategory information, as well as higher level information. The list may be directly scrolled by selecting a category with a pointing device and by dragging the list to the desired location, for example using drag and drop techniques.

The exemplary embodiment of the invention is considered to be only one of several different display formats in which the invention may be implemented. Thus, the invention can be readily implemented by one skilled in the art in any desired display format, such as Java, html, and C++. The actual generation of the GUI display can be performed using well-known hardware and software techniques.

Figure 1:
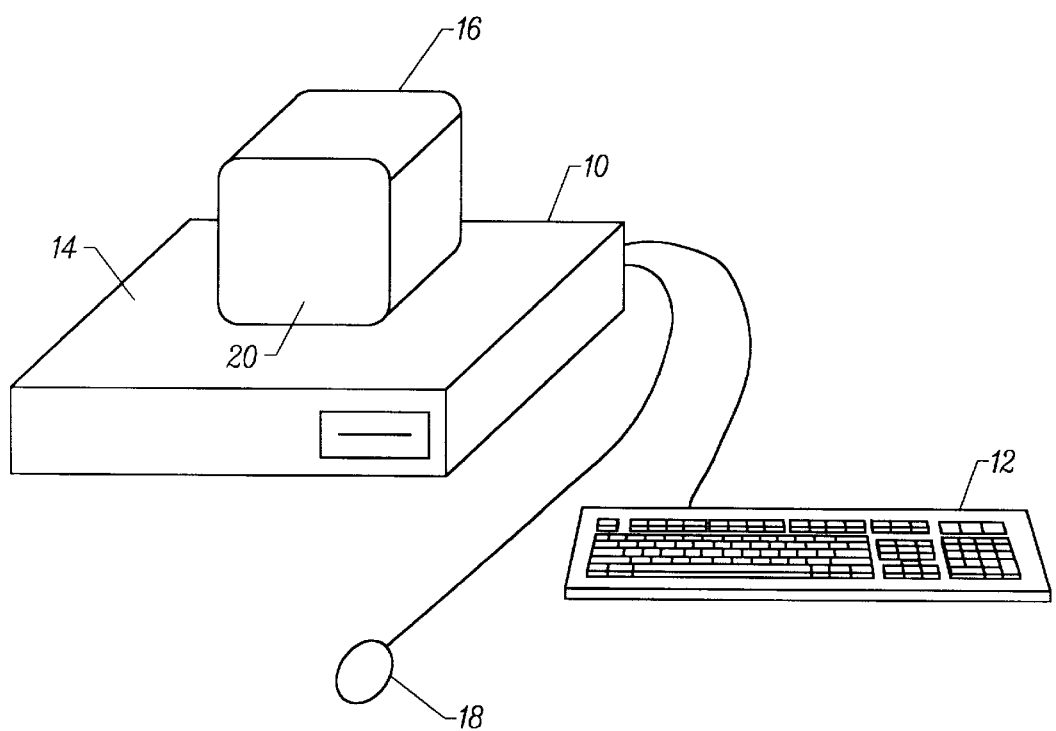
FIG. 1 is a perspective view of a computer system according to the prior art.
Figure 2:
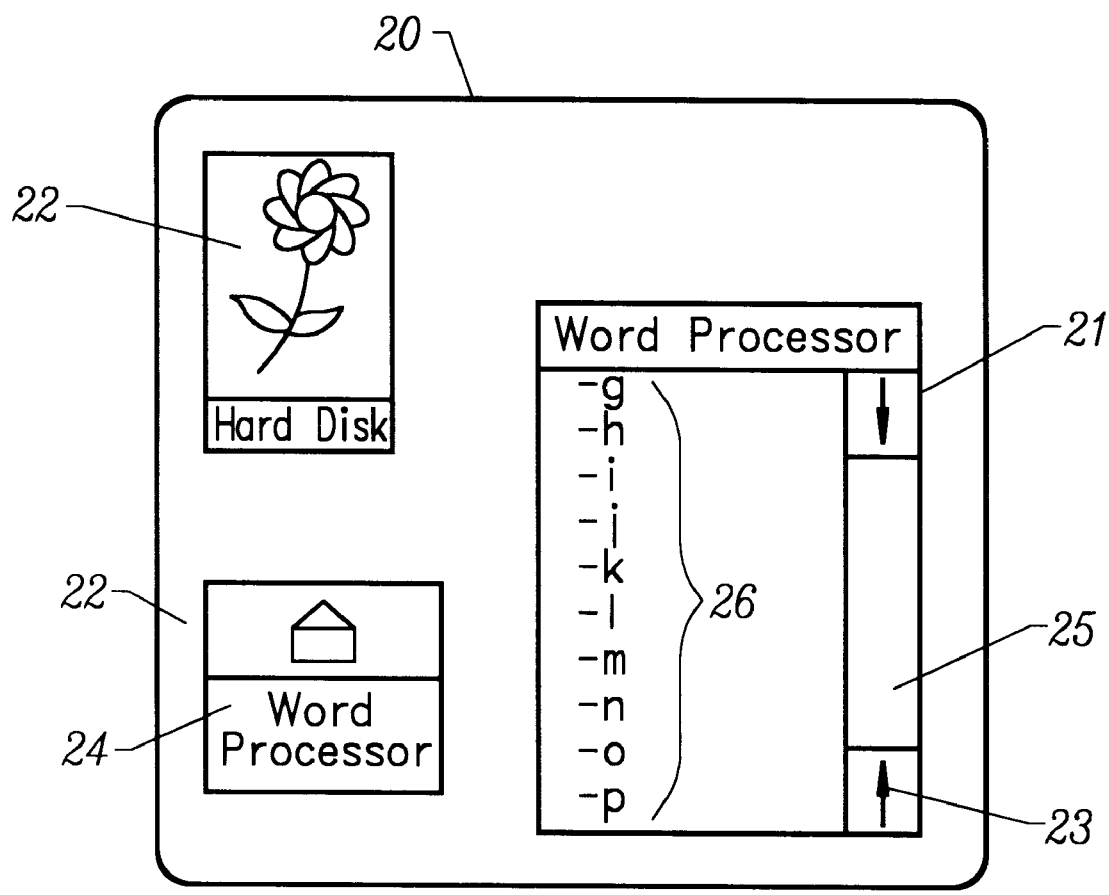
FIG. 2 is a front view of a computer display showing a text menu according to the prior art.
Figure 3:
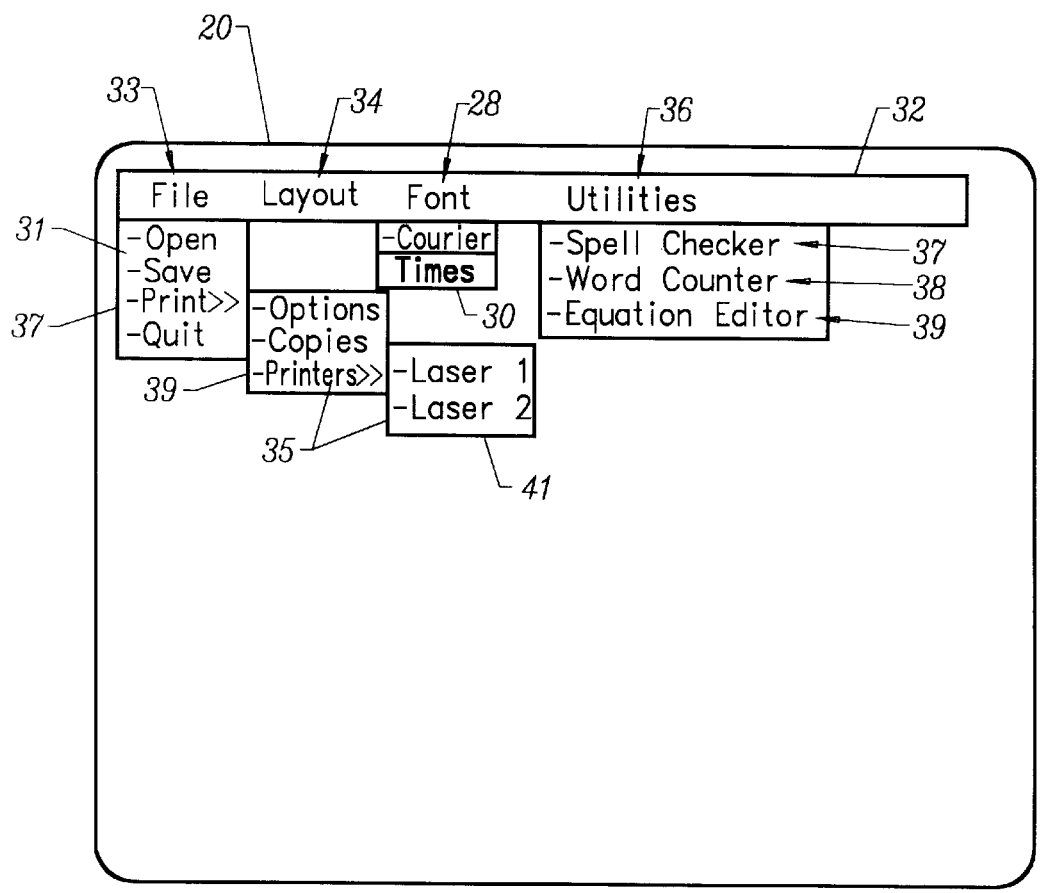
FIG. 3 is a front view of a computer display showing pictorial icons according to the prior art.
Figure 4:
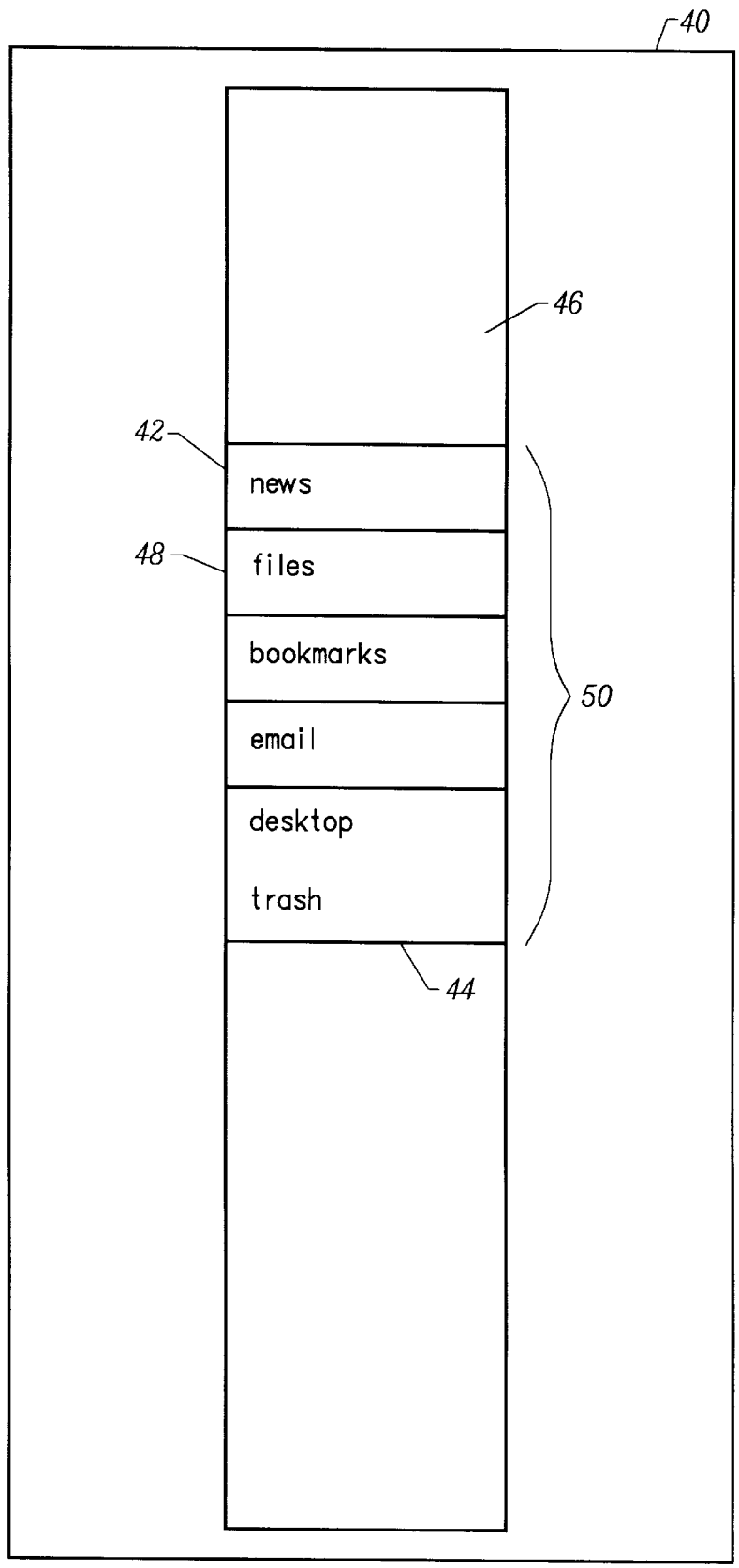
FIG. 4 is a front view of a computer display showing a first tier of a graphical user interface having a scalable file structure according to a first preferred embodiment of the invention.
Figure 5:
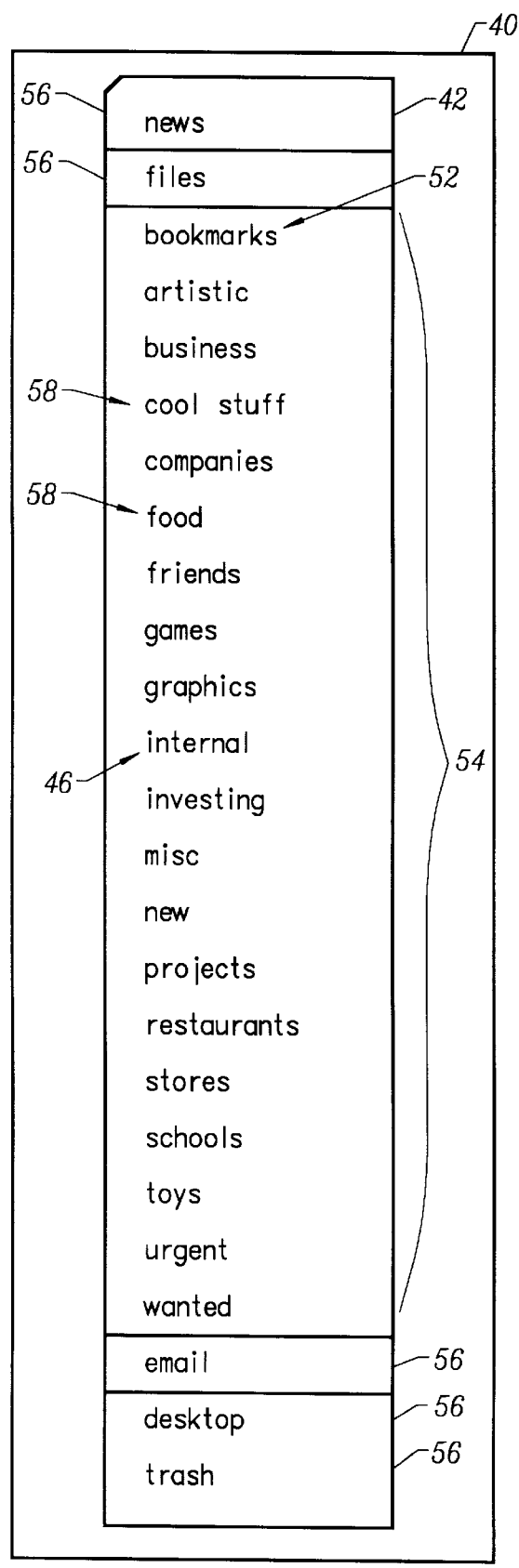
FIG. 5 is a front view of a computer display showing first and second tiers of a graphical user interface having a scalable file structure according to said first preferred embodiment of the invention.

FIGS. 4 through 8 sequentially show the operation of a first preferred embodiment of the invention. FIG. 4 provides an initial view of various defined categories. FIG. 5 shows the display after a user has selected, and thereby expanded, the "bookmarks" location. In this example, the contents of the "bookmarks" category appear below the word "bookmarks."

Figure 6:
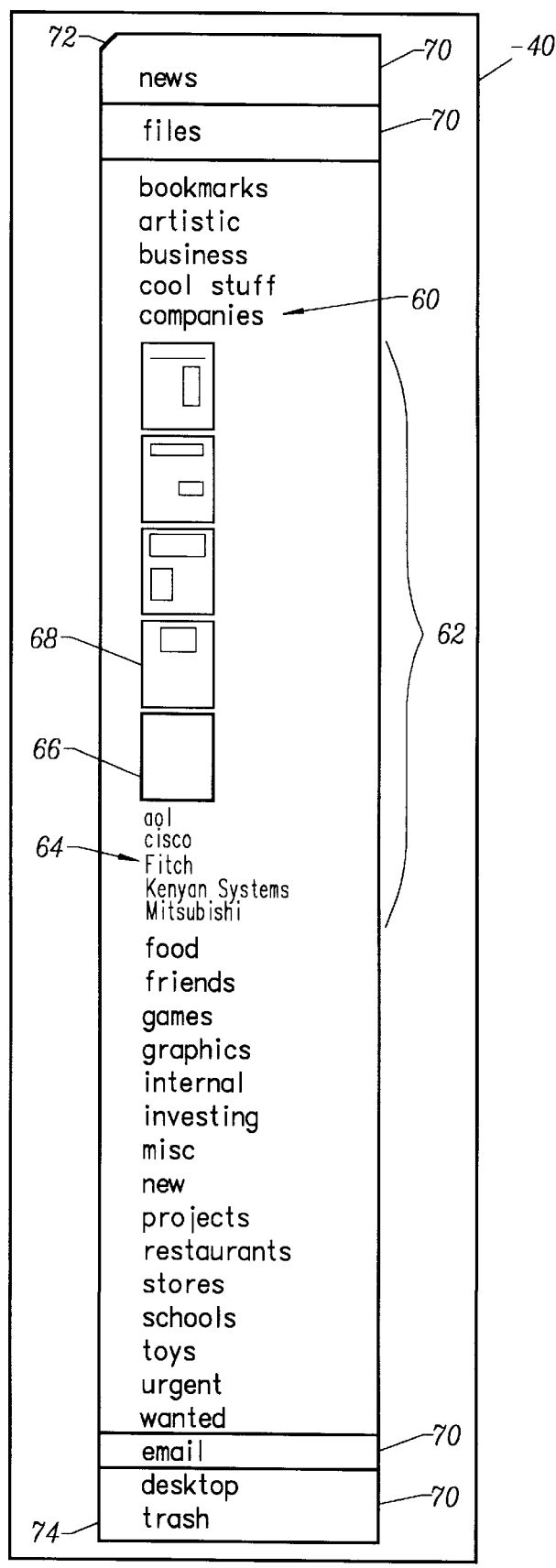
FIG. 6 is a front view of a computer display showing first, second, and third tiers of a graphical user interface having a scalable file structure according to said first preferred embodiment of the invention.
Figure 7:
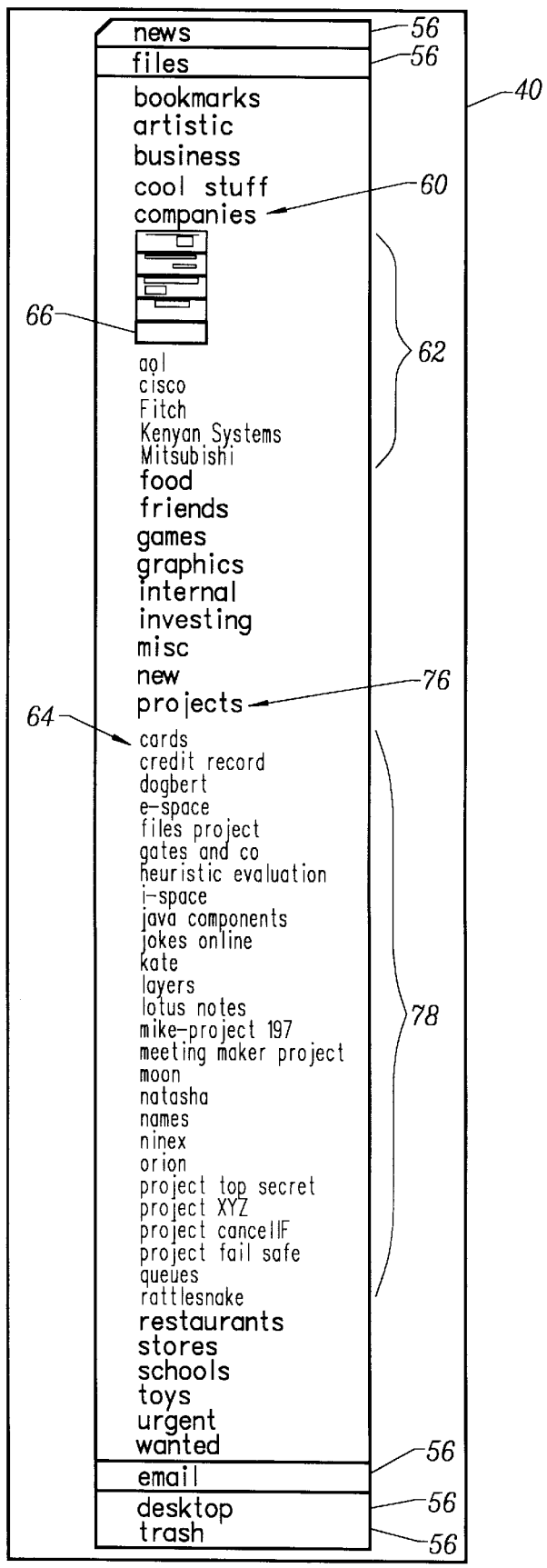
FIG. 7 is a front view of a computer display showing first, second, and a plurality of third tier contents of a graphical user interface having a scalable file structure according to said first preferred embodiment of the invention.

Each category shown in FIG. 5 is an expansive location that the user can open by selecting the text field. FIG. 6 shows the display after the user has selected the category "companies" and traversed one level deeper into the information hierarchy. The invention provides a scheme that compresses information contained in the upper and lower ends of the displayed list to create space within the list, and thereby accommodate display locations corresponding to expanded categories. FIG. 7 shows the display after the user has selected "projects" to expand this location. The list of items that appear under "projects" is scrollable. In this example, this list also shows the contents of the "projects" category. The user can traverse deeper into lower levels of the file structure by selecting yet additional entries displayed on the list for the "projects" category and/or can view other locations of the list in normal size (as well as hidden text, if some sub-levels are truncated) by dragging the list up and/or down with a pointing device, or through the use of various user-entered commands.

The various figures discussed above in summary form are now discussed in greater detail.

FIG. 4 is a front view of a computer display showing a first tier of a graphical user interface having a scalable file structure according to a first preferred embodiment of the invention. Expansive locations 42 are displayed as a list 44 on a desktop which is generated on a display, such as computer display 40. In this example, a hierarchical file structure organizes any information contained therein into levels or tiers. The top tier categories may contain subcategories, each of which may, in turn, contain subcategories. The only limitations on the number of tiers in the hierarchical file structure are the quantity of information to be categorized, and the hardware and software limitations of the computer system itself.

In a preferred embodiment of the invention, the user can create or modify user defined categories as desired. In yet another embodiment, the categories consist of regions that are pre-defined by the computer system software.

As shown on FIG. 4, a list of the categories is displayed in the top tier 50 of a file structure. Such categories may include, for example information objects, including by way of example files, commands, actions, HTML links, Java applets, streaming video, and sound objects, and aliases, and such various system entities may be segregated or combined within each category as desired. Each category 48 in the top tier of the list defines a dedicated expansive location 42. Furthermore, the invention provides a defined region 46 on the desktop within which the list is displayed. The list display may not exceed the boundaries of the defined region, but may be any desired size within the defined region.

In one embodiment of the invention, the defined region is user selected. Thus, the user may expand or contract, for example, the vertical and horizontal dimensions of the defined region as desired. Alternate embodiments of the invention, permit the user to resize the defined region by expanding or compressing the region in either a vertical or a horizontal dimension, alone or in combination. In yet another embodiment, the dimensions of the defined region are preset by the system software. Although a substantially rectangular region is shown on the figure, it should be appreciated that the shape of the region is a—matter of choice. Actual expansion of a selected region may be accomplished, for example by any indicia of hierarchical position, such as through the use of a hyperbolic drawing algorithm (discussed below), a Gaussian or logarithmic function (or other such function), selection of a different font size, color, and/or font style, or a combination thereof. Further, a marker (e.g. an icon or other differentiation) may be provided to identify a current hierarchical path within a data object.

When a category is selected, the location occupied by that category expands to display the next tier in the information structure for that category. Similarly, the location occupied by a deselected category contracts to conceal the next tier. As a result, all other categories progressively contract (upon selection of a category) or expand (upon deselection of a category). Although the expansion/contraction metaphor is applied in the preferred embodiment of the invention, it should be appreciated that groupings and/or prominence of various information objects may be indicated in many other ways (see, also, above), such as through the use of different colors, fonts, font size, and/or styles.

FIG. 5 is a front view of a desktop showing first and second tiers of a scalable file structure according to the first preferred embodiment of the invention. As shown, the category "bookmarks" 52 has been selected to display its contents. In a preferred embodiment of the invention, a pointing device, such as a mouse, is used to select a category. The category is highlighted by moving a pointer, such as a cursor, over the category and clicking the mouse button one time, as is known in the prior art. In this example, a mouse button click selects the category, and the category is then expanded to display its contents. Alternatively, if the category has already been expanded, a mouse button click contracts the category, and its contents disappear from the display. However, any appropriate device may be used to select and deselect a category (as well as to drag, and Once selected, the category 52 expands to display its contents 54. The list itself has expanded to encompass the entirety of the defined region. Because the defined region is large enough to accommodate the newly-displayed second tier contents 54, the expansive locations of the non-selected categories 56 maintain the same dimensions that they had prior to selection of this category.

The displayed contents 54 of the category include subcategories 58 that can themselves be opened to display their contents. For example, FIG. 6 is a front view of a computer display showing first, second, and third tiers of the scalable information structure. In FIG. 6, the third tier subcategory "companies" 60 is selected to display its contents 62. The displayed third tier includes both text descriptors 64 and pictorial icons 66. In other embodiments of the invention, the list categories also include, for example, such entities as embedded HTML links (not shown), embedded Newsgroup links, information objects, embedded Email links (not shown), cached World Wide Web (WWW) pages 68, video, graphics, animated sprites, and proxies or other representations for sounds.

In the example shown on the figures, the expansive locations are differentiated by color and by text descriptor ("news", "files"). In the example, the lower-tier contents of a particular category are displayed having the same color as the expansive location of the related upper-tier category. However, differentiation may be accomplished, for example by shading, highlighting,. font size or shape, and category shape. For example, different expansive locations and tiers may be distinguished by use of different fonts, font size, scale, texture, color, sound, or by indentation, as well as by the inclusion of animation or video information. Furthermore, different tiers may have different configurations, such as the cluster arrangement, described in detail below.

Information can be inserted into a category in any one or more of several ways. For example, the category may be opened, and the information file dragged to and dropped into the file with a pointing device. A "Save" function, as is well known in the prior art, can be used to store a file to disk or a record to a database. Additionally, the file may be dragged and dropped onto the category.

When a file is dropped onto an embedded HTML link, the link is activated, and the file is transferred via a computer system communication device, such as a computer network, to the Internet address represented by the HTML link. Similarly, a file dropped onto an embedded Email link or cached World Wide Web (WWW) page is transferred to the appropriate Email address of the recipient or WWW page, respectively.

In a preferred embodiment of the invention, the list is directly scrolled with a pointing device. Thus, a cursor is moved over an expansive location, a mouse button is clicked and held, and the expansive location is then dragged to a desired location within the list. The top and bottom expansive locations of the list are compressed accordingly as different portions of the list are moved for more prominent display. In an alternate embodiment of the invention, the list is scrolled by, for example a scrollbar or with keyboard commands.

The non-selected expansive locations 70 are compressed to accommodate the newly-displayed contents within the defined region of the display. In the example, the invention provides a scheme that displays all of the contents of the first three tiers within the defined region of the display on the desktop. In a preferred embodiment of the invention, the category display is compressed using a hyperbolic scaling algorithm. Thus, the displayed list of categories is most prominently compressed at the top 72 and bottom 74 edges, as if the list were bent into an arc.

FIG. 7 is a front view of a computer display showing two second-tier categories, "companies" 60 and "projects" 76 opened to display their contents 62, 78. To accommodate the entirety of the listed categories within the defined region, non-selected expansive locations 56 have been correspondingly compressed, thus making room for the new information added to the list by selection of these two categories. Additionally, the font size of the text descriptors 64 and the size of the pictorial icons 66 for the unselected categories have also been reduced.

Any text or symbols showing in the expansive locations may be proportionately resized to the dimensions of the expansive location. Alternatively, the text or symbols may maintain their size until the compression of the expansive location requires that they also be compressed. In yet another embodiment of the invention, the text or symbols are compressed, but to a lesser degree than the expansive location.

The defined region shown in the figures is vertically oriented. However, the list may also be displayed in other orientations, such as horizontally. Furthermore, the defined region may be configured in a variety of shapes, including a rectangle, oval, or triangle.

A key aspect of the invention concerns the fact that the display metaphor disclosed herein allows information objects to be placed directly into a hierarchical representation, rather than inserting placeholders into a list. For example, an actual WWW page may be placed directly into the display rather than an alias or text-based representation of the WWW page. Likewise, graphics and/or animation or video information may be placed directly into the hierarchical display. Thus, when one views a list, one sees the actual information object, rather than a label or pointer that identifies the object. This approach brings the user directly in contact with the information object by removing any unnecessary layers of reference associated with traditional hierarchical information management schemes. Thus, the information becomes the interface. It should be appreciated that it is not required that the information object be placed directly into the hierarchy in all embodiments of the invention. Additionally, it is considered that the technique used to place such object directly into the hierarchy is well known in the art. For example, a graphic information object may be placed into the hierarchy by reserving an appropriate portion of the display in the display buffer when the hierarchy is prepared for display to the user. Similar techniques, as are well known in the art, may be used to include animation or video information in the hierarchy. Finally, actual code, such as Java applets, may be placed in the hierarchy, such that selection of the object causes the code to execute. For example, selection of an item in the hierarchy may result in a connection being established for a video conference. Thus, the information object may be active or passive, or a combination of such information objects may be placed directly in the hierarchy.

Figure 8:
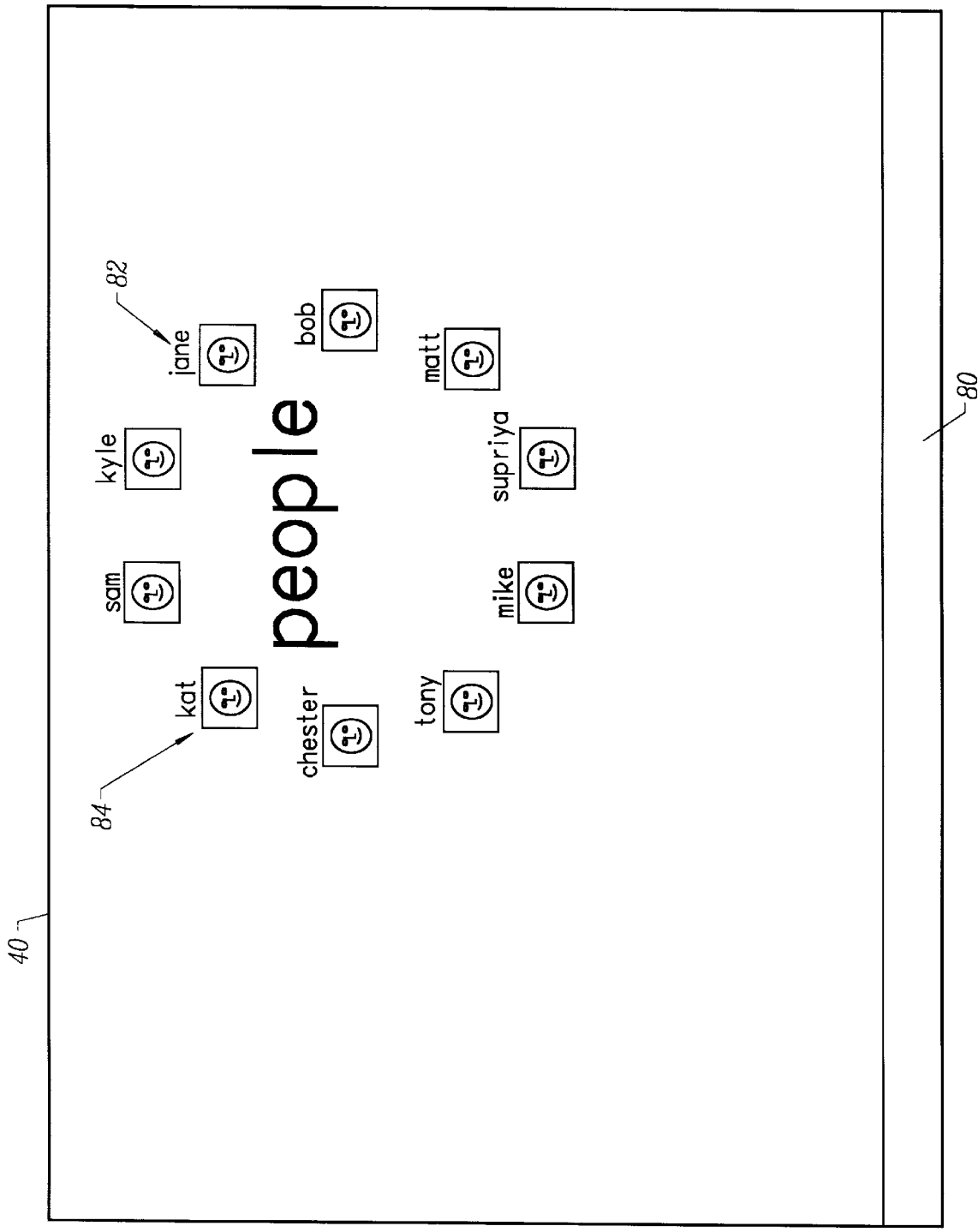
FIG. 8 is a front view of a computer display showing a graphical user interface having a scalable file structure according to a second, equally preferred embodiment of the invention.

In one embodiment of the invention, the expansive locations are displayed as a cluster arrangement of spaced expansive locations. FIG. 8 is a front view of a computer display showing a graphical user interface having a scalable file structure 80 according to a second, equally preferred embodiment of the invention. The expansive locations displayed in the cluster arrangement have the same characteristics as the expansive locations of the first preferred embodiment of the invention, as described above.

In one embodiment of the invention, a cluster is represented as circular regions of information, resembling ripples. Items in a given cluster of ripples share a common theme. For example, each ring or ripple in an investment cluster could correspond to a particular investment file.

The circular rings may be concentric to the outermost defining ring of the cluster, and may be formed either inside or outside the ring, or both. In a search cluster, for example, the outermost ripple could correspond to the most relevant search and subsequent, inner rings could represent search items in decreasing order of importance. In an alternate embodiment of the invention, each information ripple is centered around the category being expanded. Such configuration resembles the layered petals of a flower.

A cluster includes one or more categories, each occupying an expansive location. The categories within an individual cluster are preferably related. For example, the cluster 82 assigned the name "people" shown in FIG. 8 includes pictorial icons 84 representing embedded Email links to co-workers. A cluster is assigned an identifying text descriptor, is represented by a pictorial icon, or both.

When a category within the cluster is selected, its location expands to display the next tier in the information hierarchy. This next tier is displayed as another cluster, or as a list according to the first embodiment of the invention. Similarly, a list may open to display another list or a cluster. In the preferred embodiment of the invention, a cluster is moved on the desktop when it is dragged by a pointer to the desired location.

A desktop display may include a plurality of clusters. In the preferred embodiment of the invention, the display includes an animation module to permit cluster resizing, such as expanding and contracting. Thus, a selected cluster is highlighted and expanded to occupy a larger area on the desktop. Any previously-selected cluster is deselected and contracted. A selected cluster may also be relocated to a more prominent position on the desktop, such as the center of the desktop; while unselected clusters may be relocated to less prominent positions on the desktop, e.g. the periphery of the desktop.

In alternate embodiments of the invention, a selected cluster is highlighted only, expanded only, or is indicated by other means, such as sound or animation. However, the invention may be adapted to permit a plurality of clusters to be selected and expanded at the same time.

While the clusters shown in FIG. 8 are circular, one skilled in the art will readily appreciate that a cluster may take any desired shape. In one embodiment of the invention, the cluster shape is user defined. The user selects the shape, dimensions, or contents of the cluster as desired. In another embodiment of the invention, the shape of the cluster is pre-defined by the system software. Similarly, the configuration of clusters on a desktop may be user defined, or predefined by the system software.

In one embodiment of the invention, a highlighted cluster displays a table of contents of the cluster. In another embodiment, a highlighted cluster displays a preview of the contents of the cluster. For example, a cluster comprising embedded cached WWW pages displays a preview of the embedded links. This preview may be stored on a computer system database, or on a networked, server connected to the computer system.

Hyperlinks may be embedded in the preview. A user may thereby directly connect to a particular WWW page. This embodiment is advantageous as it permits the user to connect a desired link quickly without first having to connect to the Internet and load the WWW page.

Figure 9:
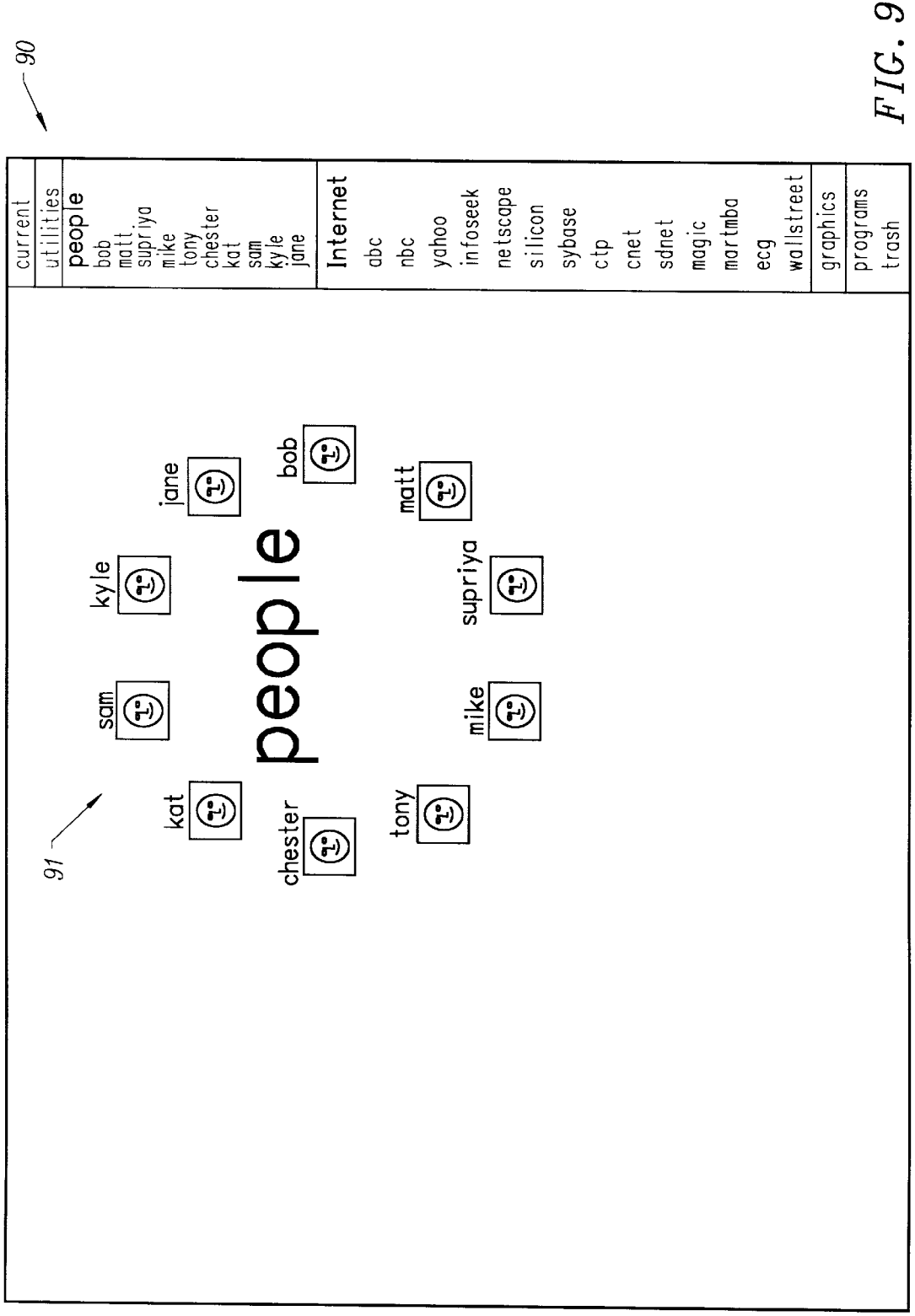
FIG. 9 is a front view of a computer display showing first and second tiers of a graphical user interface having a scalable file structure according to said first preferred embodiment of the invention, and also showing a graphical user interface having a scalable file structure according to the second, equally preferred embodiment of the invention.

FIG. 9 is a front view of a computer display showing first and second tiers of a graphical user interface having a scalable file structure according to said first preferred embodiment of the invention, and also showing a graphical user interface having a scalable file structure according to the second, equally preferred embodiment of the invention. The embodiment of the invention shown on FIG. 9 is a multiview display that incorporates both the expandable/compressible list of the first embodiment of the invention and the cluster or ripple display of the second embodiment of the invention. In this embodiment of the invention, each display list may be linked such that selection of a category or information object on one list produces a change in the other list. For example, selecting the category "people" on the expandable/compressible list 90 opens a cluster of "people" 91 that includes the names and photos of the persons who populate the list "people." It should be appreciated that operations on the cluster may produce a reaction on the expandable/compressible list in a similar fashion. Further, it should be appreciated that each format of list may exist on a display simultaneously, although there is no linkage between the two lists, i.e. the list formats may coexist independently.

Figures 10A, 10B:
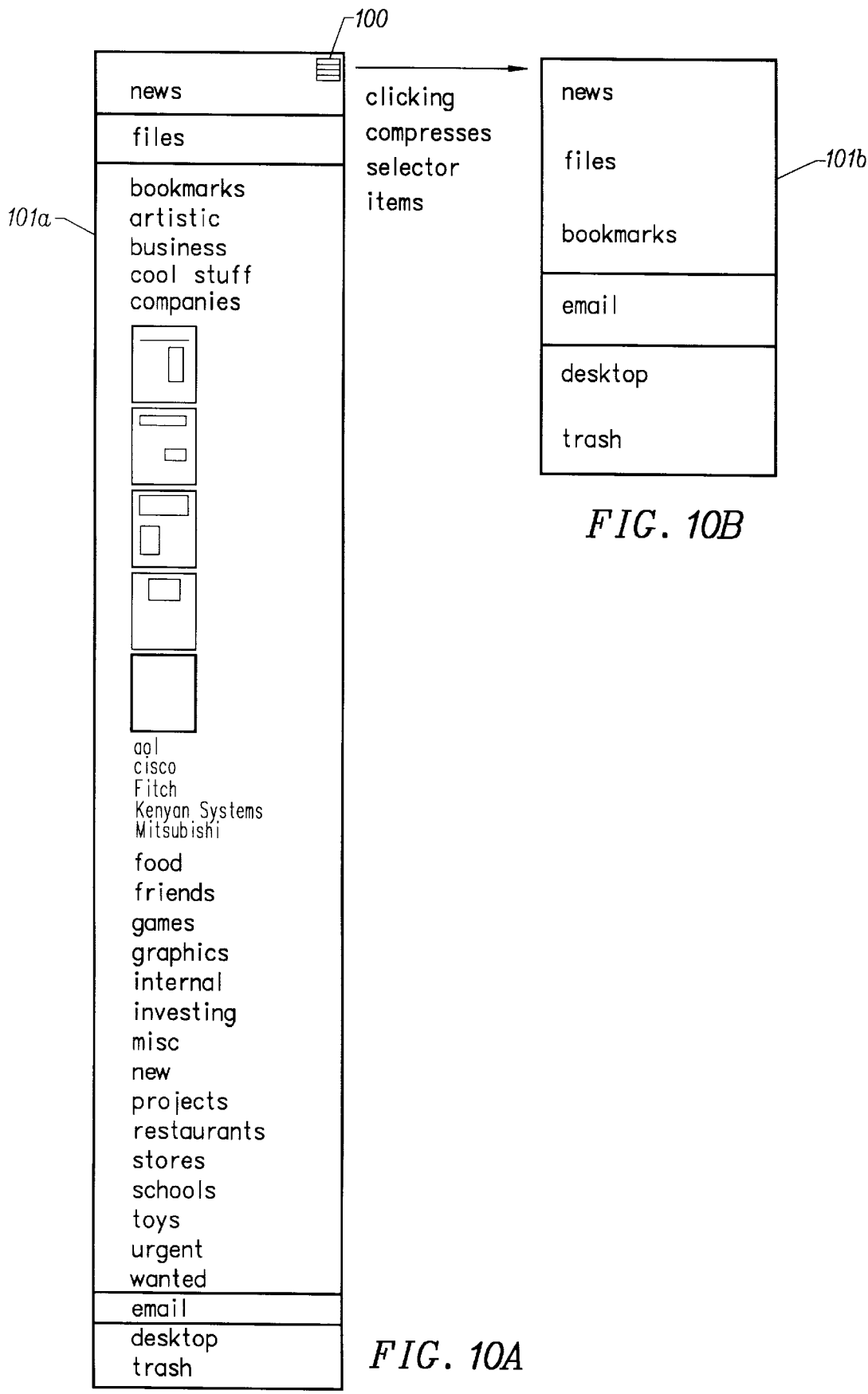
FIGS. 10a and 10b provide front views of a computer display showing a quick compress icon for collapsing an expanded scalable file structure according to a third, equally preferred embodiment of the invention.

FIGS. 10A and 10b provide front views of a computer display showing a quick compress icon for collapsing an expanded scalable file structure according to a third, equally preferred embodiment of the invention. In FIG. 10A, a list 101a is shown in expanded form in accordance with the invention herein. In the expanded list, the category "bookmarks" have been expanded. The list includes a compress button 100. When the compress button is selected, for example by a mouse click or text command, the displayed list collapses to its highest level (as shown on FIG. 10b as the list 101b). It should be appreciated that the compress button may provide a single level of collapse for each mouse click or it may collapse the display to the highest level of the hierarchy. The compress button is readily implemented as part of the GUI using well known technique.

Figure 11:
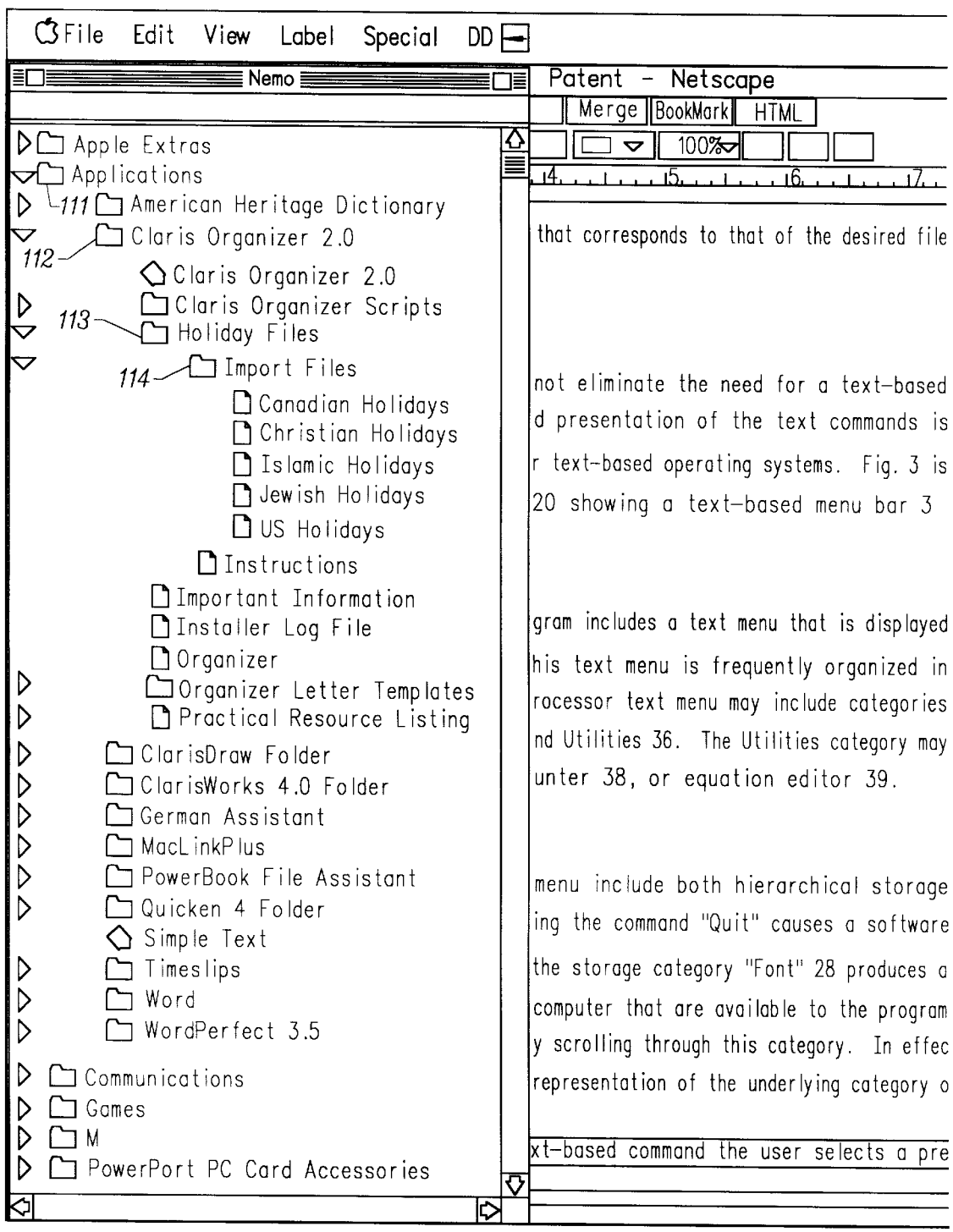
FIG. 11 is a front view of a computer display showing a horizontal file hierarchy as is known in the art.

FIG. 11 is a front view of a computer display showing a horizontal file hierarchy as is known in the art. As can be seen on FIG. 11, a folder "applications" 111 is shown opened. The folder 111 includes several additional folders, including the folder "Claris Organizer 2.0" 112. This folder 112, in turn, includes a folder "Holiday Files" 113, which in turn includes a folder "Import Files" 114. As can been seen, as each level of the hierarchy is accessed, the amount of the display that is required to show the file structure increases by an equal amount. Because successive indentation remain constant, the horizontal display space available to the hierarchy is rapidly consumed.

Figure 12:
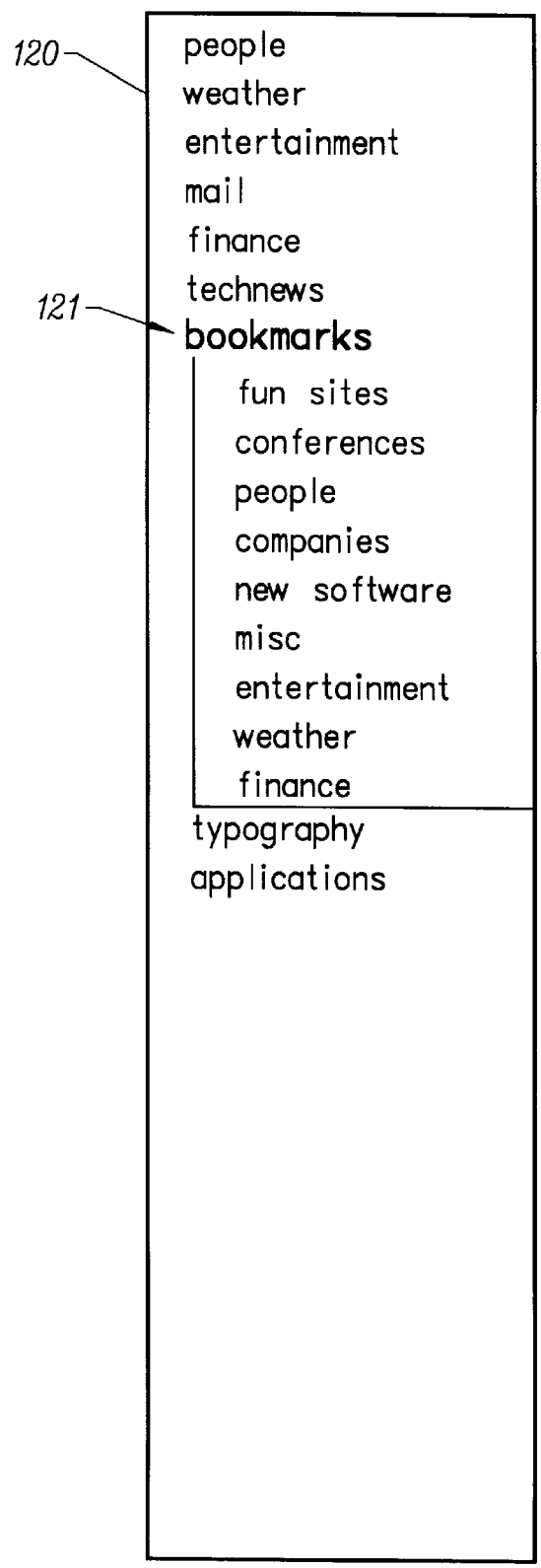
FIG. 12 is a front view of a computer display showing a first level of dynamic scalable indentation according to a fourth, equally preferred embodiment of the invention.

FIG. 12 is a front view of a computer display showing a first level of dynamic scalable indentation according to a fourth, equally preferred embodiment of the invention. In this embodiment of the invention, selection of an information object "bookmarks" 121 contained on a list 120 causes a first level of indentation, such that the contents of the information object are displayed.

Figure 13:
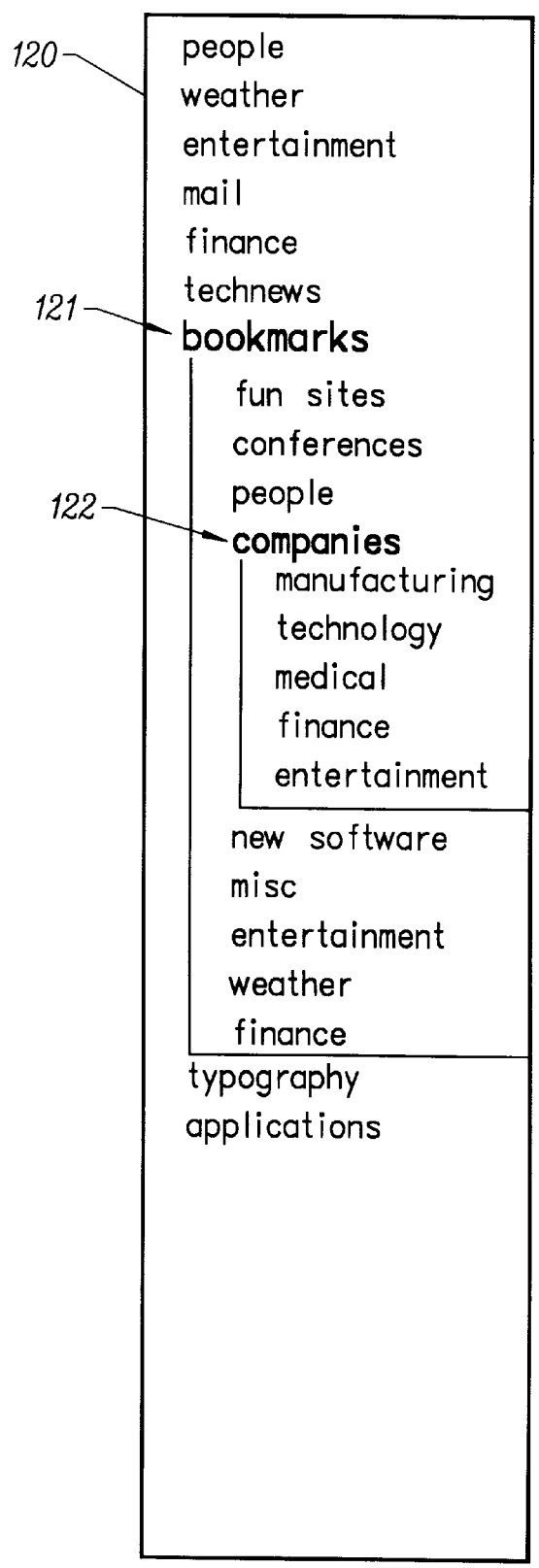
FIG. 13 is a front view of a computer display showing a first and a second level of dynamic scalable indentation according to the fourth, equally preferred embodiment of the invention.

FIG. 13 is a front view of a computer display showing a first and a second level of dynamic scalable indentation. On FIG. 13, the information object for "bookmarks" 121 is shown to include a selected information object "companies" 122. As nested containers (information objects) are expanded, only the last container expanded is displayed with maximum indentation. All preceding levels of indentation are scaled back dynamically. For example, in FIG. 13, the "companies" container is more indented than the "bookmarks" container. Such dynamic scaling of the indentation is readily implemented, for example by using a hyperbolic function as discussed above. In the preferred embodiment of the invention, a minimum indent of three pixels is provided and a maximum indent of twelve pixels is provided, where all indentation fall within this range of pixel values. It should be appreciated that any range of indentation may be chosen as desired and appropriate. Further, greater indentation may be provided to higher levels of the hierarchy rather than lower levels of the hierarchy, if desired.

Figure 14:
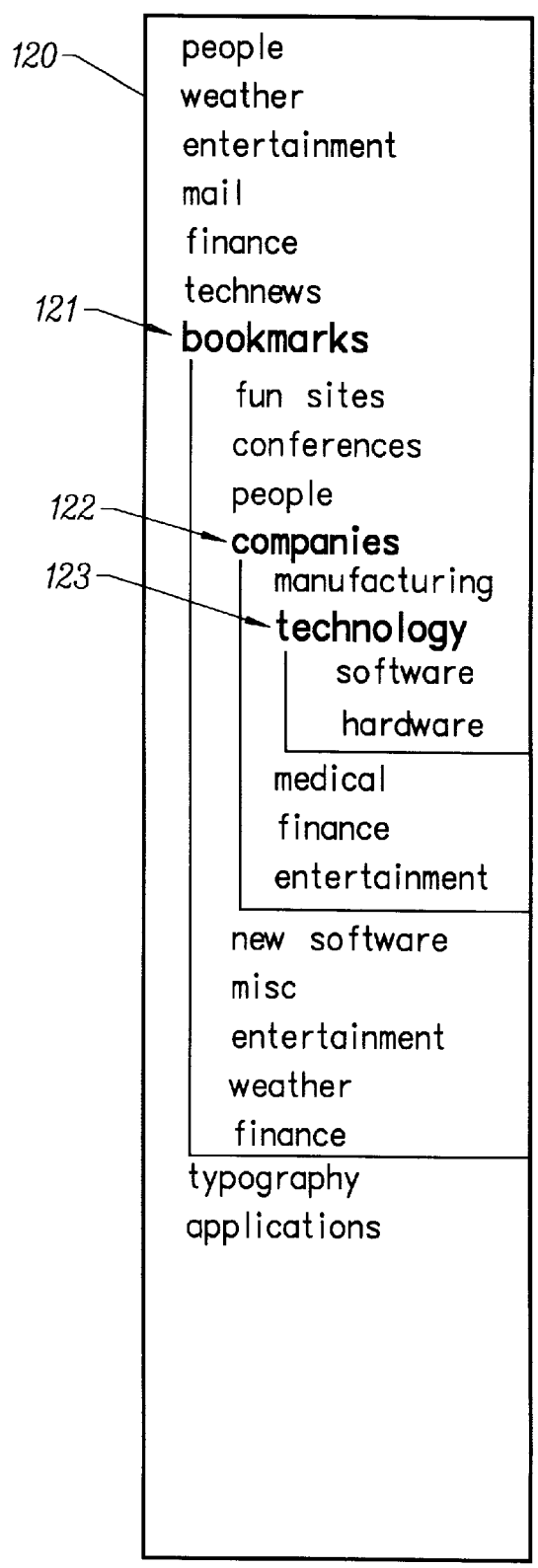
FIG. 14 is a front view of a computer display showing a first, a second, and a third level of dynamic scalable indentation according to the fourth, equally preferred embodiment of the invention.
Figure 15:
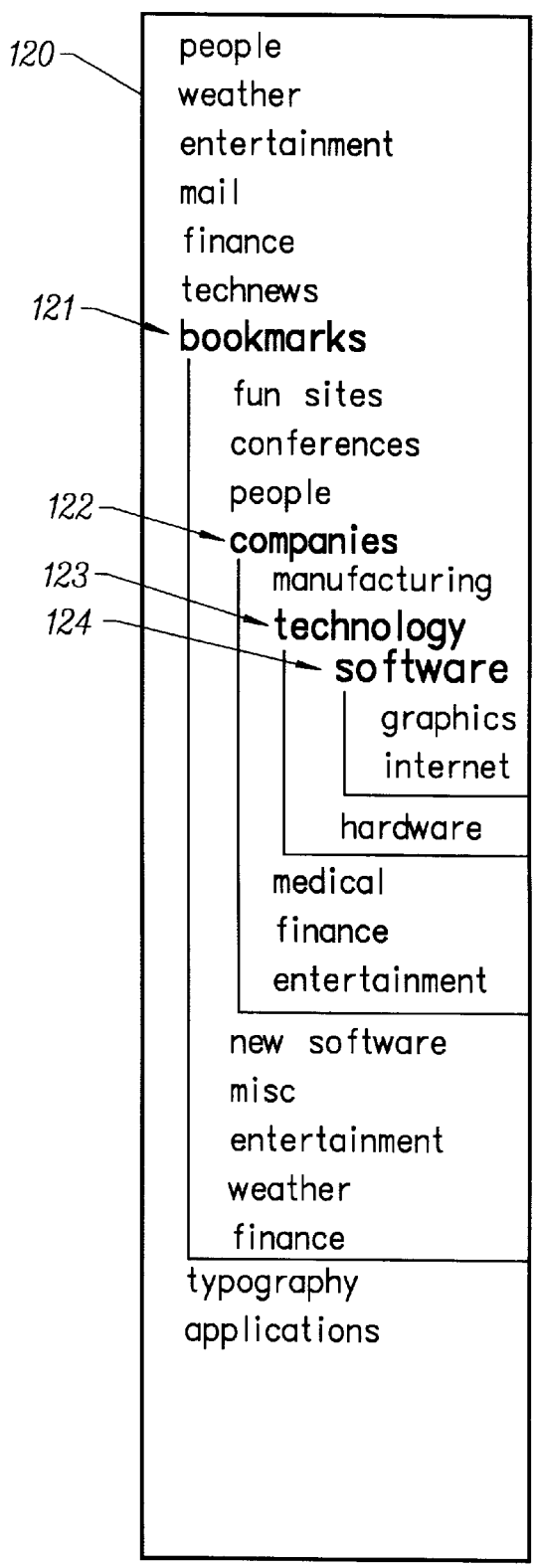
FIG. 15 is a front view of a computer display showing a first, a second, a third, and a fourth level of dynamic scalable indentation according to the fourth, equally preferred embodiment of the invention.
Figure 16:
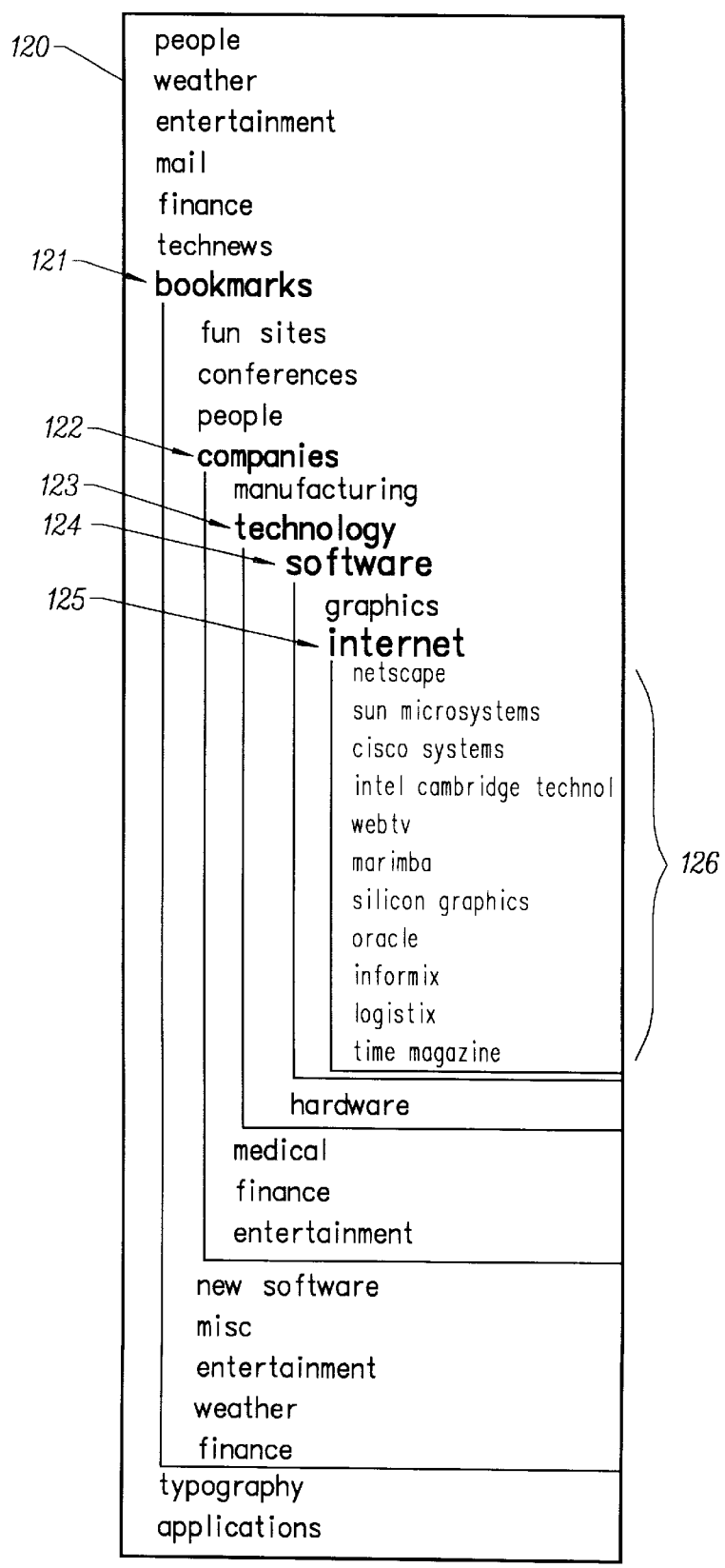
FIG. 16 is a front view of a computer display showing a first through fifth levels of dynamic scalable indentation according to the fourth, equally preferred embodiment of the invention.

FIG. 14 is a front view of a computer display showing a first, a second, and a third level of dynamic scalable indentation that includes a user selected information object "technology" 123. FIG. 15 is a front view of a computer display showing a first, a second, a third, and a fourth level of dynamic scalable indentation that includes a user selected information object "software" 124. FIG. 16 is a front view of a computer display showing a first through fifth levels of dynamic scalable indentation that includes a user selected information object "internet" 125. As can be seen from FIGS. 12–16, the indentation of each level of the hierarchy is dynamically adjusted as the hierarchy is traversed. It should also be noted on FIG. 16 that, as the list expands vertically, the contents of each container may be compressed in accordance with the first embodiment of the invention. Thus, FIG. 16 shows the contents of the information object "internet" 125 as a compressed list 126. Accordingly, this embodiment of the invention is readily combined with the other embodiments of the invention disclosed herein.

Although the invention is described herein with reference to the preferred embodiment, one skilled in the art will readily appreciate that other applications may be substituted for those set forth herein without departing from the spirit and scope of the present invention. For example, the invention may be implemented as a JAVA application, using the JAVA language developed by Sun Microsystems, Inc. of Mountain View, Calif. Alternatively, the invention may be provided as a part of an operating system, browser, networking software, screen saver, software applications program, or as a plug-in for an existing software program. The graphical user interface having a scalable file structure according to the invention is readily adapted to any computer-based system having a microprocessor, a display, and data entry means.

Accordingly, the invention should only be limited by the claims included below.

What is claimed is:

1. A graphical user interface for viewing a hyperbolically scalable linear information structure, comprising:

a display upon which an interactive graphical user interface may be viewed, said interactive graphical user interface including at least one defined region on said display;

a scalable user-accessible linear information structure displayed within said region and having at least one expansive location denoting an information object; and a selection device for selecting said at least one expansive location to display linearly said information object denoted by said expansive location;

means for the contents of said information object corresponding to said selected expansive location to be displayed linearly within said region;

means for information otherwise contained within said region to be compressed linearly to accommodate the entirety of said information object contents within said region; and means for said expansive location to be movable linearly to any location within said defined region, while maintaining compression of said other information in said defined region, wherein the term linear means in a vertical or horizontal direction on said display, and expansion and compression is performed hyperbolically.

2. The apparatus of claim 1, further comprising:

at least a second expansive location, wherein said second expansive location is compressed in response to the selection of said first expansive location.

3. The apparatus of claim 1, wherein said scalable information structure comprises a list.

4. The apparatus of claim 1, wherein said scalable information structure comprises at least a first cluster.

5. The apparatus of claim 4, further comprising:

at least a second cluster, wherein, upon highlighting or selection of said first cluster, said second cluster display is contracted and said first cluster is enlarged.

6. The apparatus of claim 4, further comprising:

at least a second cluster, wherein, upon highlighting or selection of said first cluster, said first cluster is moved to a central portion of said display screen.

7. The apparatus of claim 1, wherein a pointing device is used to select said expansive location at a first location within said defined region, and to drag said expansive device to a second location.

8. The apparatus of claim 3, wherein the contents of said expansive location comprise a cluster.

9. The apparatus of claim 4, wherein the contents of said expansive location comprise a list.

10. The apparatus of claim 1, wherein said expansive locations are selected from the group consisting of text commands, text descriptors, and pictorial icons.

11. The apparatus of claim 1, wherein a Hypertext Markup Language (HTML) link is embedded within said expansive location.

12. The apparatus of claim 1, wherein a cached World Wide Web page is embedded within said expansive location.

13. The apparatus of claim 1, wherein said interactive graphical user interface is implemented as part of an operating system for a computer system.

14. The apparatus of claim 1, wherein said interactive graphical user interface is implemented at least in part as one of a screen saver, browser, software program, module, or networking application for said computer system.

15. The apparatus of claim 1, wherein said interactive graphical user interface is implemented at least in part as a Java application.

16. A graphical user interface for viewing a hyperbolical scalable linear information structure comprising:

an interactive graphical user interface for viewing said scalable linear information structure on a display;

said interactive graphical user interface comprising at least one defined region on said display;

said region comprising at least one expansive location representing an information object;

means for selecting said at least one expansive location to display linearly said information object represented by said expansive location within said region;

means for said expansive location to be movable linearly to any location within said defined region, while maintaining a compression of other information in said defined region; and wherein said other information contained within said region is compressed linearly to accommodate the entirety of said information object, as well as the entirety of said other information contained within said region, all within said defined region, and wherein the term linear means in a vertical or horizontal direction on said display, and expansion and compression is performed hyperbolically.

17. The structure of claim 16, further comprising:

at least a second expansive location, wherein said second expansive location is compressed in response to the selection of said first expansive location.

18. The structure of claim 16, wherein said scalable information structure comprises a list.

19. The structure of claim 16, wherein said scalable information structure comprises a cluster.

20. The structure of claim 19, wherein animation is used to contract a second cluster display and enlarge said first cluster display upon highlighting or selection of said first cluster.

21. The structure of claim 20, wherein said first cluster is moved to a central portion of said display screen upon selection.

22. The structure of claim 16, wherein a pointing device is used within said defined region to directly select said expansive location at a first location, and to drag said expansive device to a second location.

23. The structure of claim 18, wherein the contents of said expansive location comprise a cluster.

24. The structure of claim 19, wherein the contents of said expansive location comprise a list.

25. A method for providing a graphical user interface, comprising the steps of:

providing at least one defined region on a computer display;

displaying linearly within said defined region a hyperbolically scalable user-accessible linear information structure having at least one expansive location representing an information object;

selecting said at least one expansive location to display linearly said information object represented by said expansive location;

compressing linearly information otherwise contained within said region to accommodate the entirety of a file structure, as well as said information otherwise contained within said region, all within said defined region; and providing means for said expansive location to be movable linearly to any location within said defined region, while maintaining compression of said other information in said defined region, wherein the term linear means in a vertical or horizontal direction on said display, and expansion and compression is performed hyperbolically.

26. A graphical user interface for viewing a hyperbolically scalable linear information structure, comprising:

an interactive graphical user interface for viewing said scalable linear information structure on a display;

said interactive graphical user interface comprising at least one defined region on said display;

said region comprising at least one expansive location representing an information object;

means for selecting said at least one expansive location to display linearly said information object represented by said expansive location within said region;

a hyperbolic scaling means for linearly altering information otherwise contained within said region to accommodate the entirety of said information object, as well as the entirety of said information otherwise contained within said region, all within said defined region; and wherein said expansive location is movable linearly to any location within said defined region, while maintaining alteration of said other information in said defined region;

wherein the contents of said information object corresponding to said selected expansive location are linearly displayed within said region;

wherein information otherwise contained within said region is compressed linearly to accommodate the entirety of said information object contents within said region; and wherein the term linear means in a vertical or horizontal direction on said display, and expansion and compression is performed hyperbolically.

27. A graphical user interface for viewing a scalable information structure, comprising:

an interactive graphical user interface for viewing said scalable information structure on a display;

said interactive graphical user interface comprising at least one defined region on said display;

said region comprising at least one indentable location representing an information object;

means for selecting said at least one indentable location to indent said information object; and means for dynamically scaling the indentation of said information object upon selection and indentation of a second information object located at an indentable location within said first information object;

a scalable user-accessible information structure displayed within said region and having at least one expansive location denoting an information object; and a selection device for selecting said at least one expansive location to display said information object denoted by said expansive location;

wherein the contents of said information object corresponding to said selected expansive location are displayed within said region; and wherein information otherwise contained within said region is compressed to accommodate the entirety of said information object contents within said region.

28. The structure of claim 27, wherein said indentation is dynamically scaled by a hyperbolic scaling algorithm.

* * * * *